US012634219B2

(12) United States Patent
Cody

(10) Patent No.: US 12,634,219 B2
(45) Date of Patent: *May 19, 2026

(54) MAPPING UDP PACKETS TO PROBE

(71) Applicant: Censys, Inc., Ann Arbor, MI (US)

(72) Inventor: Jeffrey Cody, Fort Wayne, IN (US)

(73) Assignee: Censys, Inc., Ann Arbor, MI (US)

( * ) Notice: Subject to any disclaimer, the term of this patent is extended or adjusted under 35 U.S.C. 154(b) by 45 days.

This patent is subject to a terminal disclaimer.

(21) Appl. No.: 18/657,287

(22) Filed: May 7, 2024

(65) Prior Publication Data

US 2025/0350549 A1      Nov. 13, 2025

(51) Int. Cl.
*H04L 43/12*      (2022.01)
*H04L 9/40*      (2022.01)

(52) U.S. Cl.
CPC .......... *H04L 43/12* (2013.01); *H04L 63/1483* (2013.01)

(58) Field of Classification Search
None
See application file for complete search history.

(56) References Cited

U.S. PATENT DOCUMENTS

| | | | | |
|---|---|---|---|---|
| 7,243,143 B1* | 7/2007 | Bullard | .................. | G06Q 50/60 |
| | | | | 705/30 |
| 7,852,774 B2* | 12/2010 | Shen | ....................... | H04L 43/12 |
| | | | | 370/241 |
| 7,885,190 B1* | 2/2011 | Roesch | ................. | H04L 67/125 |
| | | | | 709/224 |
| 10,812,364 B1* | 10/2020 | Ramabadran | ....... | H04L 49/3063 |
| 2009/0135728 A1* | 5/2009 | Shen | ................... | H04L 41/0853 |
| | | | | 370/250 |
| 2022/0394017 A1* | 12/2022 | Solanki | ............... | H04L 63/0428 |
| 2023/0135240 A1* | 5/2023 | Cody | .................. | H04L 63/1433 |
| | | | | 709/230 |

* cited by examiner

*Primary Examiner* — Ranodhi Serrao
(74) *Attorney, Agent, or Firm* — David R. Stevens; Stevens Law Group

(57)      ABSTRACT

The ephemeral port of a probe UDP packet is populated with a first value that is a function of the destination address and destination port of a target as well as a random seed. The first value may also be a function of the local address of the server generating the probe UDP packet. The destination port of a response UDP packet is compared to a second value that is a function of the source address, source port, and the random seed, and possibly the destination address. If the destination port matches the second value, the response packet is determined not to be spoofed. Probe packets may be generated by multiple probes and labeled with a local address and index assigned to the probe to enable response packets to be mapped back to a probe.

18 Claims, 8 Drawing Sheets

UDP Target 108

Nework Stack 106

UDP Scanner 104

200a

Select Destination Address 202

Generate Hash From Destination Address, Local Address, Destination Port, Random Seed 204

Generate UDP Packet with Ephemeral Port Set to Hash 206

Inject Packet In Network Stack 208

Forward Packet to Destination Address 210

Transmit Reply Packet to Local Address and Ephemeral Port 212

UDP Source 222

Transmit Response to Local Address and a Destination Port 420

Nework Stack 106

Forward Packet to UDP Scanner 422

UDP Scanner 104

Extract Bits From Destination Port 424

Map Packet to UDP Probe Per Destination Address and Bits 426

Update Probe Metric 428

400b

MAPPING UDP PACKETS TO PROBE

FIELD OF THE INVENTION

The present invention relates generally to systems and methods for mapping UDP packets to a probe.

BACKGROUND OF THE INVENTION

User Datagram Protocol (UDP) is a connectionless protocol in which packets are sent by a source to a destination address without having previously established a connection. Verification of receipt may not be required in some application or be verified by a higher layer in the protocol stack. Because of the connectionless nature of UDP, malicious actors will often send out UDP packets with source addresses of some other entity, i.e., spoofing.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
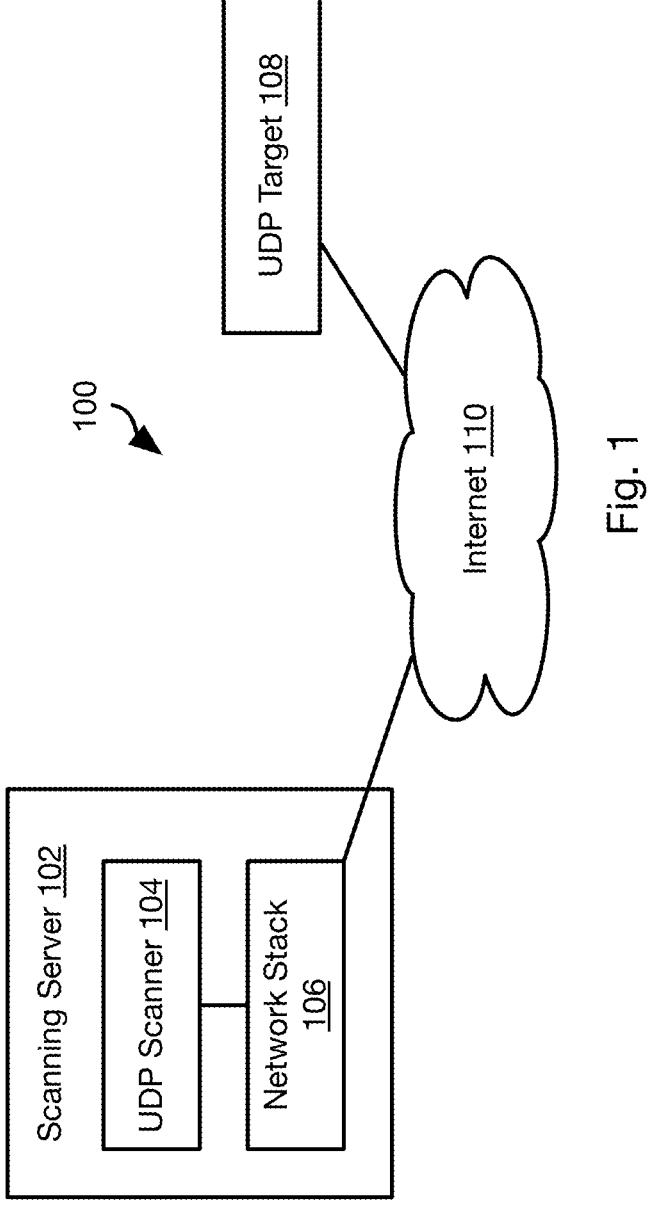
FIG. 1 is a schematic block diagram of a network environment for implementing a service with respect to cloud-based applications in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Referring to FIG. 1, a scanning server 102 may be implemented as a computing device, such as a computing device having some or all the attributes of a computing device 500 described below with respect to FIG. 5. The scanning server 102 may execute a user datagram protocol (UDP) scanner 104. The UDP scanner 104 may generate UDP packets that are then injected into the network stack 106 of the scanning server 102 and transmitted over a network to a UDP target 108. The UDP scanner 104 may operate in a user space of an operating system of the scanning server 102 whereas the network stack 106 operates in the kernel space of the scanning server 102.

The UDP target 108 may be a computer system performing a legitimate or malicious function with the objective of the UDP scanner 104 being to assess the UDP target 108. The network connecting the scanning server 102 to the UDP target 108 may be the Internet 110, a local area network (LAN), wide area network (WAN), or any other type of network.

Figure 2A:
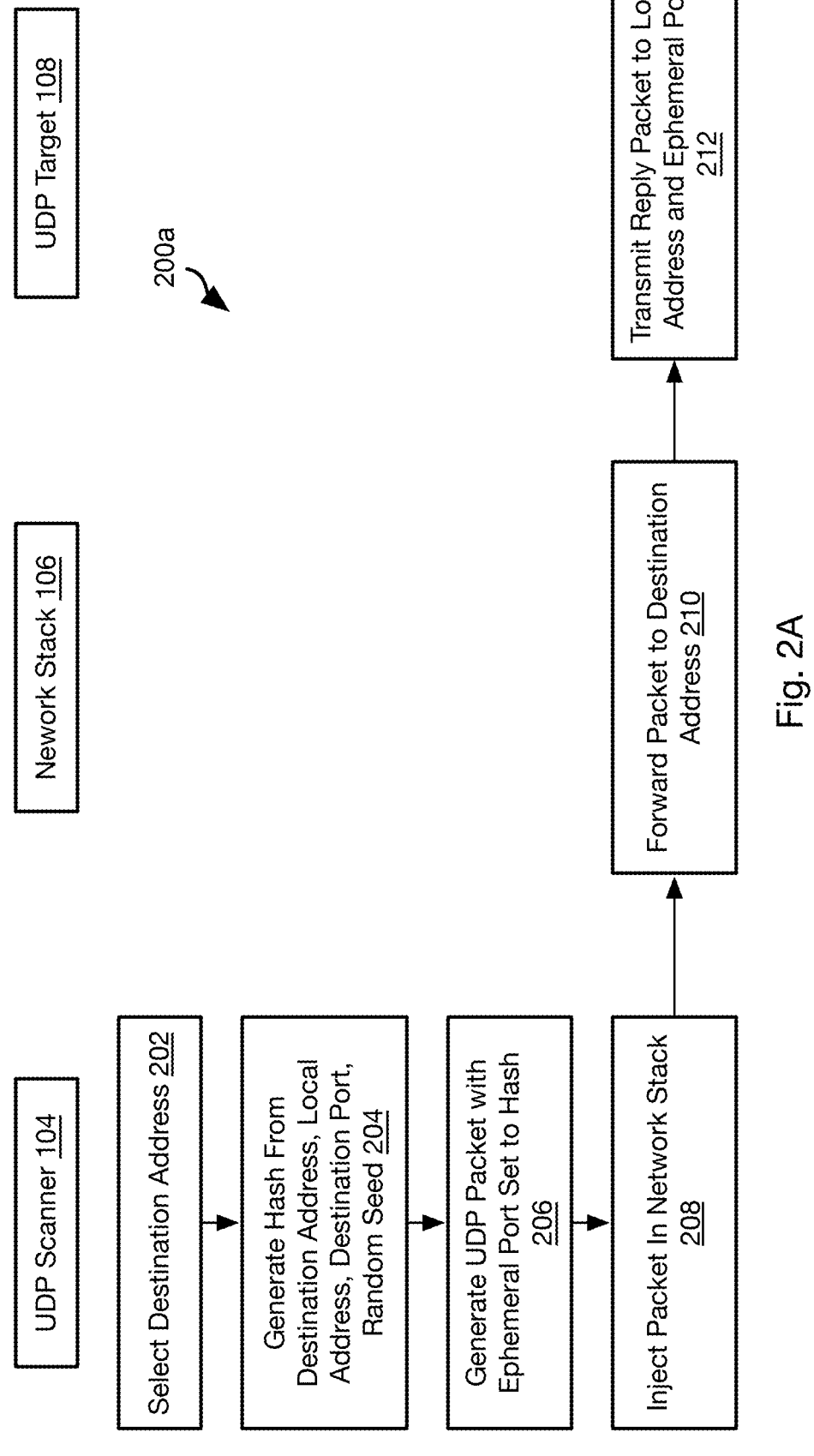
FIG. 2A is a process flow diagram of a method for performing spoofing-resistant UDP scanning in accordance with an embodiment of the present invention.

Referring to FIG. 2A, since UDP is a connectionless protocol, spoofing attacks using UDP are abundant. Any computer system may transmit a packet having the source and destination address thereof set to any address. The UDP scanner 104 may advantageously distinguish between spoofed packets and packets that are responsive to scanning traffic generated by the UDP scanner 104.

The illustrated method 200a may be used to filter out significant quantities of spoofed UDP packets, which reduces the computational burden on the UDP scanner 104 and improves the accuracy of information obtained using the UDP scanner 104.

The method 200a may include the UDP scanner 104 selecting 202 a destination address to which to send a UDP packet. The destination address (e.g., an internet protocol (IP) address) may be selected at random, from a database of known IP addresses of potential threats, or based on some other criteria. Step 202 may further include selecting a destination port, e.g., the port associated with a service, such as secure shell (SSH), hypertext transport protocol (HTTP), or the like.

The UDP scanner may generate 204 a hash of a combination of the destination address, a local address, e.g., an IP address assigned to the scanning server 102, and the destination port. The local address may be one of multiple local addresses assigned to the scanning server 102 (see FIGS. 4A to 4C and associated description, below). The hashing function may be a lossy hash function in that multiple combinations of destination and local addresses may yield the same hash. For example, the number of bits available to represent the hash may be 16 bits or less whereas the destination and local address may each include 16 bits, 32 bits, or more. In some embodiments, the hash function is a Fibonacci hash function, though other lossy hash functions may also be used.

In some embodiments, the hash is generated from the destination address, local address, destination port and a random seed. The random seed may be a randomly, or pseudo-randomly, generated value. The random seed may be associated with a particular time period: each UDP packet generated by the UDP scanner 104 during a time period may use the same random seed. The random seed may be stored in association with the time period and used as described below. The time period may have a duration of one second or less, one minute or less, one hour or less, or a larger duration.

The UDP scanner 104 may then generate 206 a probe UDP packet ("the probe packet") including the destination address and local address as the destination and source addresses of the packet and an ephemeral source port number. The ephemeral source port number may be set equal to the hash. Alternatively, a portion of the bits of the ephemeral source port number maybe set equal to the hash with other bits of the ephemeral source port number being used for other purposes (see FIG. 4C and corresponding description).

Other fields of the probe packet and the payload data may be selected by the UDP scanner 104 according to any approach known in the art. In particular, payload data may be selected to mimic a particular service, attempt to access a particular service, or other action. The payload data may also be random data. The destination port number of the probe packet may be the port conventionally used for the service mimicked by the payload data.

The UDP scanner 104 may inject 208 the probe packet from step 206 in the network stack 106, which then forwards 210 the probe packet to the destination address, e.g., the UDP target 108. The UDP target 108 may either ignore the probe packet or transmit 212 a response packet. An actual response from the UDP target 108 that is a response to the probe UPD packet will include the local address from the probe packet as the destination address, the source address of the UDP target 108 as the source address, and the ephemeral port number from the UDP packet as the destination port number. The response from the UDP target 108 may include the destination port number of the probe packet as the source port number thereof.

Figure 2B:
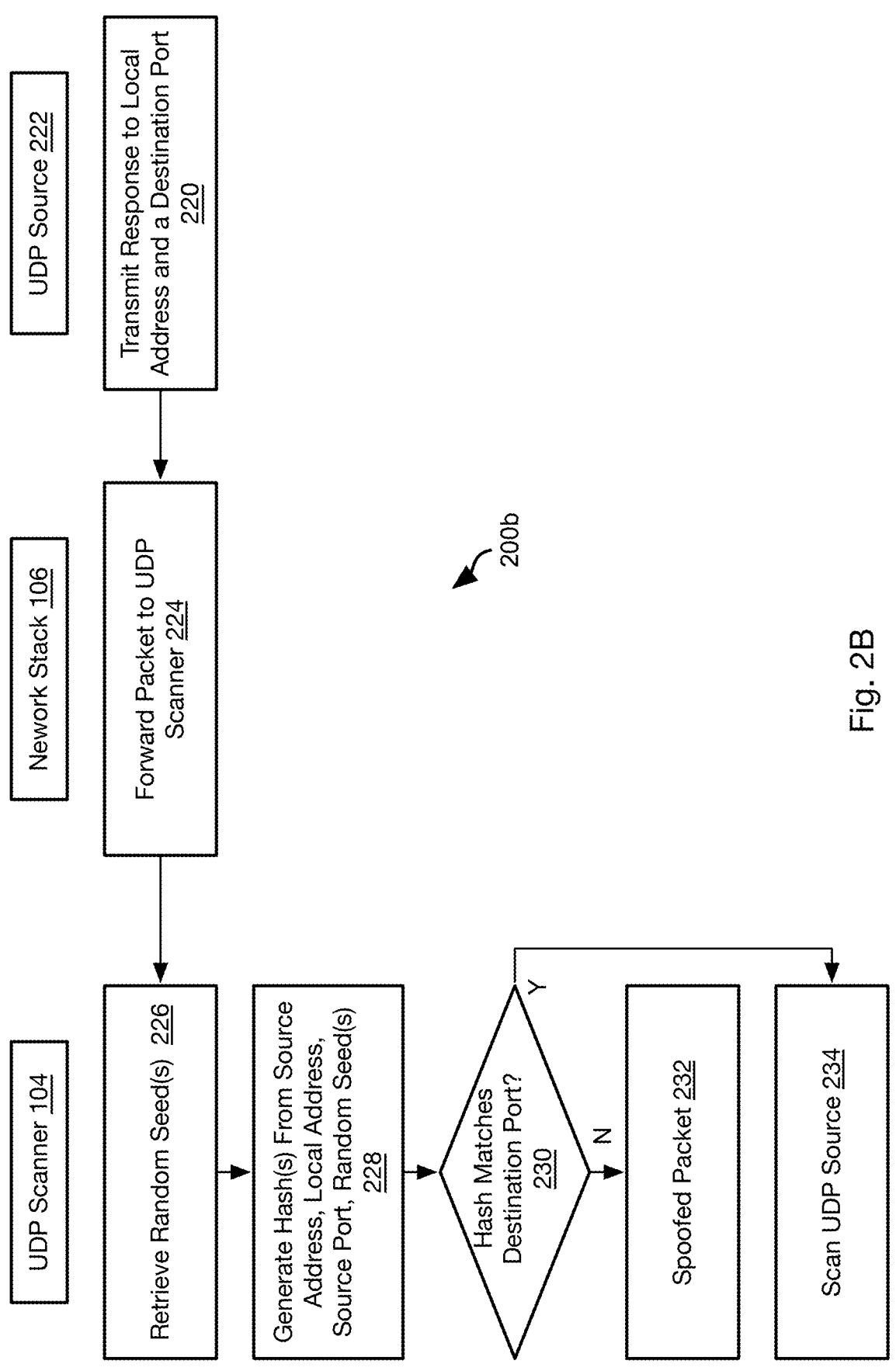
FIG. 2B is a process flow diagram of a method for filtering out spoofed UDP packets in accordance with an embodiment of the present invention.

FIG. 2B illustrates a method 200b that may be performed in order to filter out spoofed UDP packets. For example, the method 200b may be used to determine whether a UDP packet ("response packet") transmitted 220 from a UDP source 222 was transmitted by a UDP target 108 in response to a probe packet in a previous iteration of the method 200a.

The network stack 106 may receive the response packet and forward 224 the response packet to the UDP scanner 104. The UDP scanner 104 may retrieve 226 a random seed used in a previous iteration of the method 200a. For example, the UDP scanner 104 may retrieve the random seed for a time period including the current time and one or more random seeds for one or more time periods immediately preceding the current time, such as one, two, or more time periods. In particular, the number of time periods may correspond to a maximum delay expected or allowed to receive a response to a probe packet. E.g., the oldest time period for which a random seed is retrieved may include the time of receipt of the response packet minus the maximum delay.

The method 200b may include generating, for each random seed retrieved at step 228, a hash from the source address, destination address, source port, and the random seed. The arrangement of these values when applying the hash function may match the ordering of step 204 of the method 200a. For example, the list below describes the substitution of fields of the probe packet used at step 204 for fields of the response packet when generating the hash at step 228:

> source address (probe packet)→destination address (response packet)
>
> destination address (probe packet)→source address (response packet)
>
> destination port (probe packet)→source port (response packet)

The result of step 228 is a hash that may be compared 230 to the destination port of the response packet. A packet sent from a UDP target 108 will use the ephemeral port of the probe packet as the destination port and will therefore match. A packet that is not sent from a UDP target 108 will most likely not match, though there is a non-zero probability that a match may occur. For example, at least 90 percent of spoofed packets may be correctly identified as such and ignored. This drastically reduces the amount of computational resources wasted by processing spoofed packets.

If the hash does not match the destination port of the response packet, the response packet is deemed 232 a spoofed packet and may be ignored. If the hash does match the destination port of the response packet, then further action may be taken. For example, the method 200a may include scanning 234 the UDP source 222. Scanning 234 may include performing a scan of some or all layers of the network stack of the UDP source 222. Scanning 234 may include verifying that a service in fact exists at the source of the response packet, e.g., the service corresponding to the destination port of the probe packet and/or the payload of the probe packet.

Figure 3:
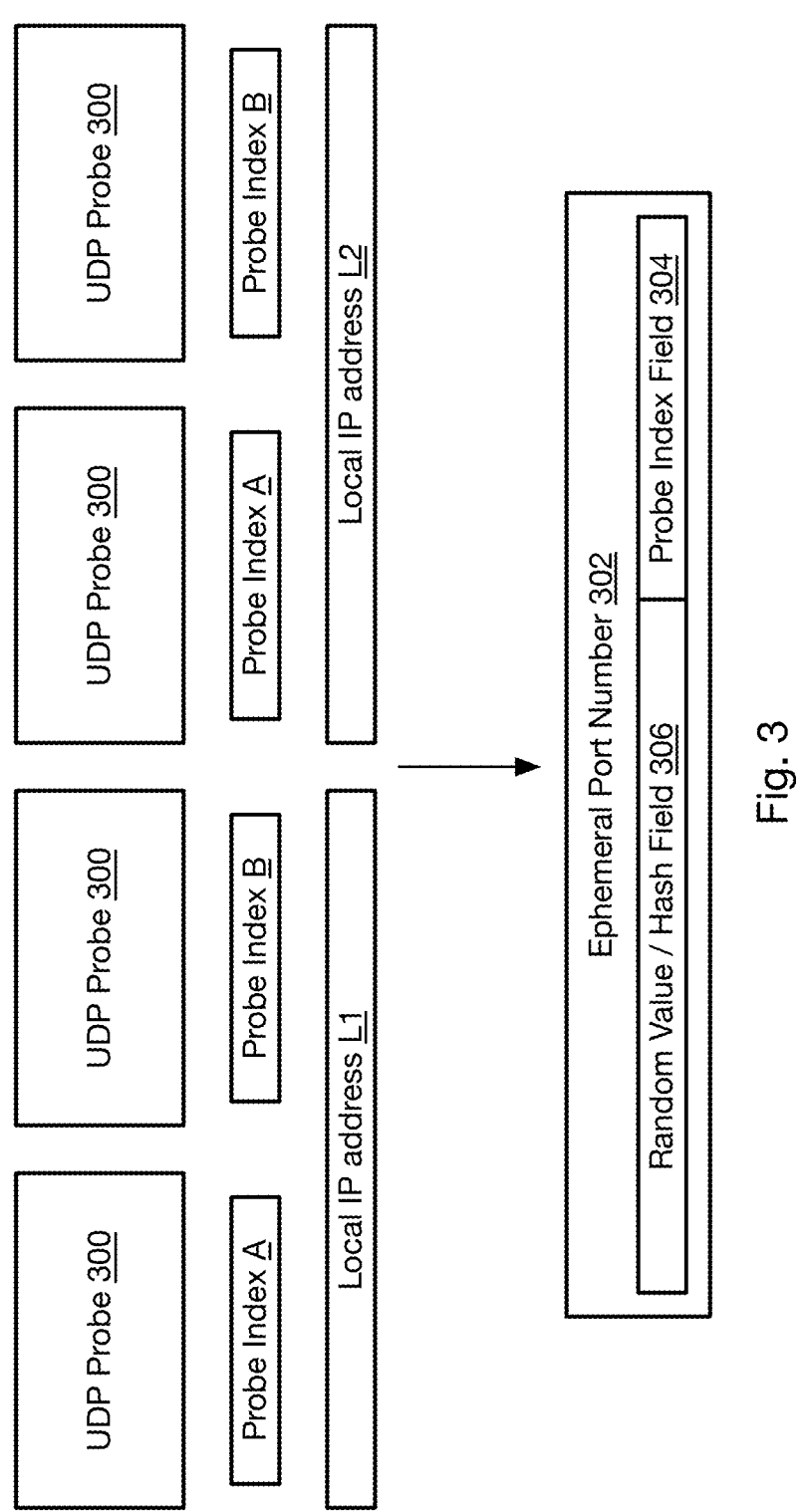
FIG. 3 is a diagram illustrating the mapping of UDP probes to ephemeral port addresses in accordance with an embodiment of the present invention.

Referring to FIG. 3, in some embodiments, a UDP scanner 104 may additionally or alternatively, implement a plurality of UDP probes 300. Each UDP probe 300 generates packets intended to mimic or otherwise engage a particular service. Each UDP probe 300 may therefore use port numbers, payload data, and/or other formatting that mimics the behavior of a client or server participating in a particular service. In other embodiments, a UDP probe 300 may generate payloads including random data with different probes generating different types of random data.

There may be many UDP probes 300, such as at least 10, at least 100, at least 1000, or more UDP probes 300. The UDP scanner 104 may have a plurality of local addresses, e.g., local internet protocol (IP) addresses, assigned thereto. Each probe 300 is assigned, or assigned to, a local address of the plurality of local addresses. Assignments of the UDP probes 300 may be distributed (e.g., evenly) among the local addresses with some variation from an even distribution where the number of UDP probes is not evenly divisible by the number of local addresses. Each UDP probe 300 may further be assigned, or assigned to, one of a plurality of probe indexes. The probe indexes assigned to UDP probes 300 assigned to the same local address are unique. However, the same indexes may be assigned to other UDP probes assigned different local addresses. Accordingly, the local address and index of a UDP probe 300 uniquely identifies each UDP probe 300.

For example, as shown in FIG. 3, one UDP probe 300 is assigned probe index A and local IP address L1 whereas another UDP probe 300 is assigned probe index A and local IP address L2. The number of probe indexes may correspond to a number of bits available to represent the probe index in a probe packet as described below, such as 8 probe indexes for three bits, 16 probe indexes for four bits, and so on.

For example, the ephemeral port number 302 in a probe packet may include a probe index field 304 that records the probe index of a UDP probe 300 that generated the payload and/or other fields of the probe packet. The probe index field 304 may occupy less than all of the bits used to represent the ephemeral port number. The remaining bits of the ephemeral port number may be occupied with random data or a hash field 306. A hash included in the random data or hash field 306 may be a hash generated as described above with respect to the method 200a.

Figure 4A:
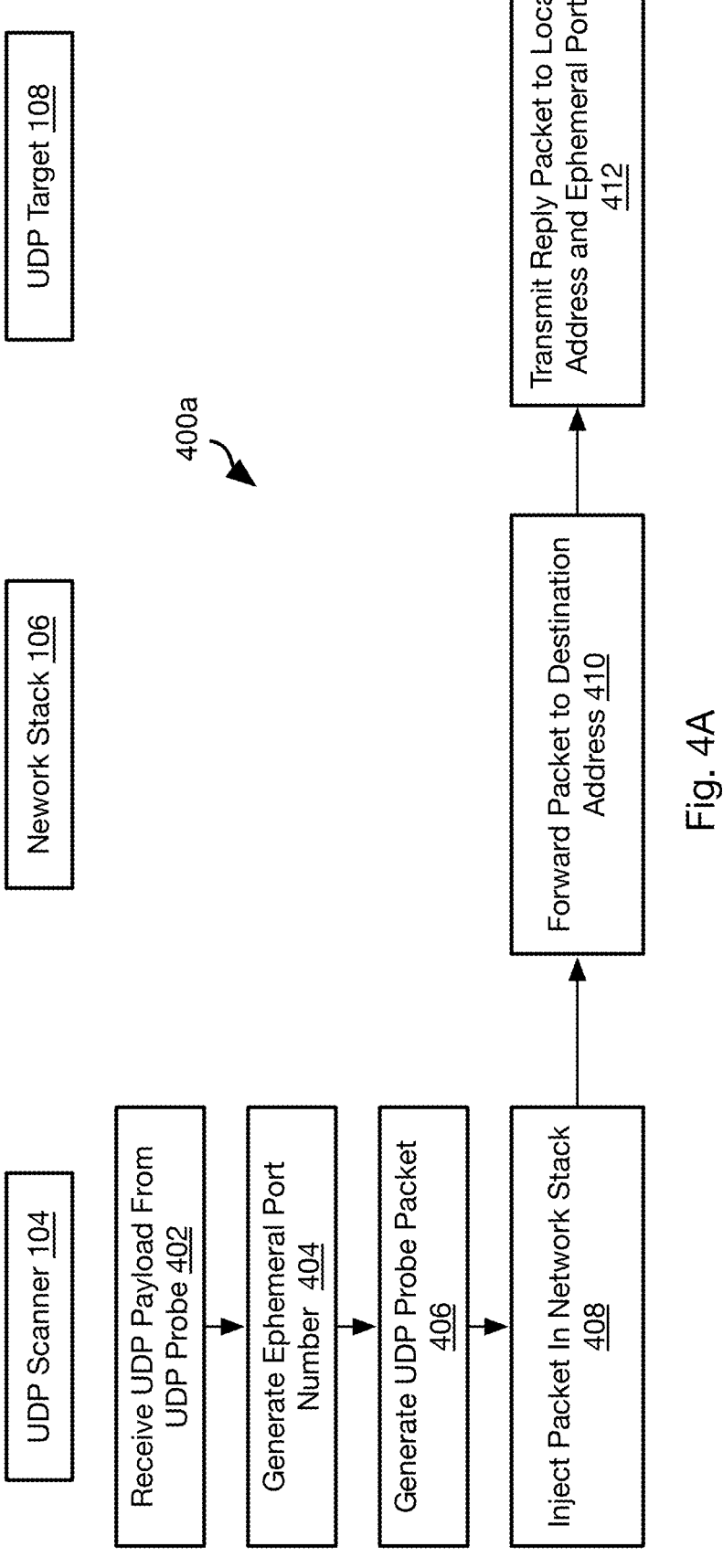
FIG. 4A is a process flow diagram of a method for generating probe packets in accordance with an embodiment of the present invention.

FIG. 4A illustrates a method 400a for transmitting a UDP probe packet ("probe packet") from a UDP probe 300. The method 400a may be performed for some or all UDP probes 300 defined by the UDP scanner 104.

The method 400a may include the UDP scanner 104 receiving 402 a UDP payload from the UDP probe 300. The UDP payload may be formatted and/or contain data corresponding to a particular service. Step 402 may include receiving a destination port number corresponding to the service.

The method 400a may include the UDP scanner 104 generating 404 an ephemeral port number. For example, step 404 may include adding a probe index of the UDP probe 300 to the ephemeral port number. Step 404 may include adding a hash to the ephemeral port number, the hash being generate according to step 204 of the method 200a.

The method 400a may include generating 406 a UDP probe packet ("probe packet") including the ephemeral port number as the source port, the destination port from step 402 as the destination port, and the local address of the UDP probe 300 as the source address. The destination address may be set to that of the UDP target 108, which may be selected as described above with respect to step 202 of the method 200a. The probe packet may further include the payload data from step 402. The UDP scanner injects 408 the probe packet into the network stack which then forwards 410 the probe packet to the destination address of the UDP packet, i.e., the UDP target 108.

The UDP target 108 may then transmit 412 a response UDP packet ("response packet") to the scanning server 102, the response packet including the ephemeral port number as the destination port and the local address of the UDP probe 300 as the destination address. The source address of the response packet may be the destination address of the probe packet and the source port of the response packet may be the destination port of the probe packet.

Figure 4B:
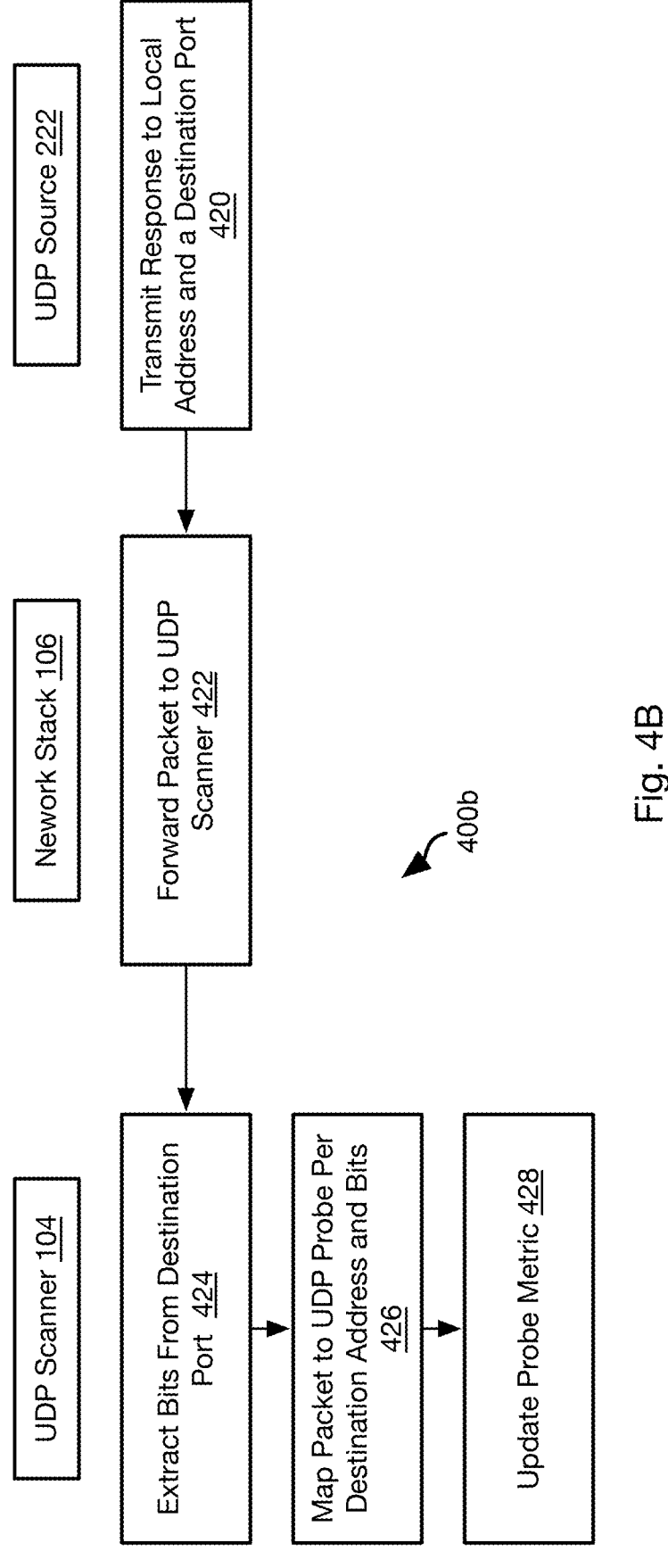
FIG. 4B is a process flow diagram of a method for associating received UDP packets with a UDP probe in accordance with an embodiment of the present invention.

FIG. 4B illustrates a method 400b for assigning received packets to UDP probes 300. A UDP source 222 transmits 420 a response packet that includes the local address of a UDP probe 300 as the destination address thereof and a destination port number. The network stack 106 receives the response packet and forwards 422 the response packet to the UDP scanner 104.

The UDP scanner 104 extracts 424 bits from the destination port number of the response packet. For example, the N least significant bits may be used at step 404 of the method 400a such that the N least significant bits are extracted 424. Other bit locations, including the N most significant bits may be used in a like manner. N may be any integer up to the total number of bits used to represent the destination port number, such as 3, 4, or more bits.

The UDP scanner may map 426 the extracted bits and the destination address of the response packet to a UDP probe

300 having a probe index matching the extracted bits and a local address matching the destination address of the response packet.

The response packet may then be processed further with respect to the UDP probe 300 identified at step 426. For example, one or more metrics of the UDP probe 300 may be updated 428. For example, one objective of the UDP scanner 104 may be to identify services on hosts and to identify those UDP probes 300 that are successful at eliciting a response from hosts. Accordingly, step 426 may include updating a counter or other metric to indicate that the UDP probe 300 received yet another response.

Figure 4C:
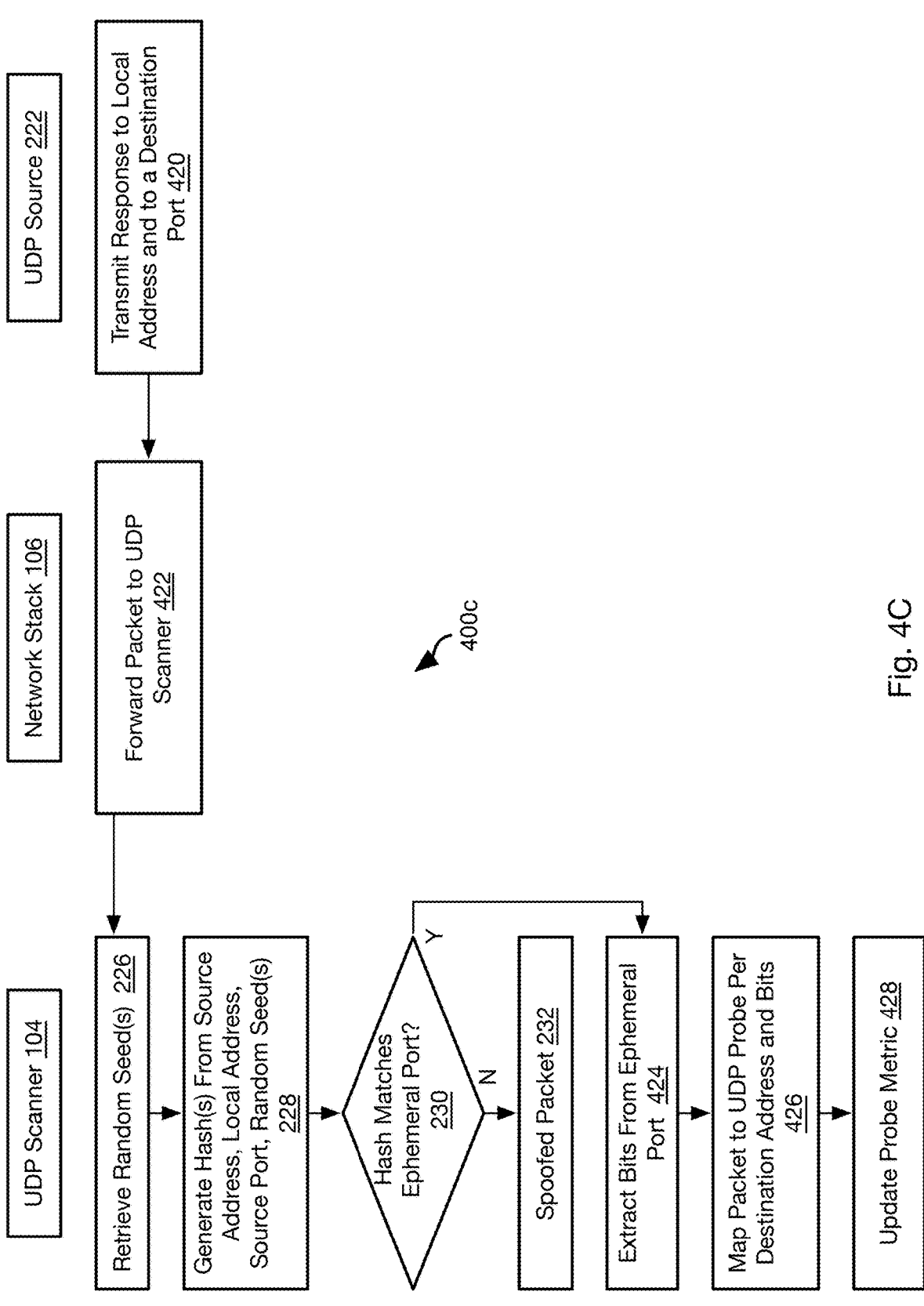
FIG. 4C is a process flow diagram of a method for filtering spoofed UDP packets and associating received UDP packets with a UDP probe in accordance with an embodiment of the present invention.

Referring to FIG. 4C, in some embodiments, the methods 200b and 400b may be combined to implement the illustrated method 400c in order to filter out spoofed UDP packets as well as associate packets with UDP probes 300. For example, steps 420 and 422 may be followed by performing steps 226-232 of the method 200b. For those packets that are not identified 232 as spoofed packets, steps 424, 426, and 428 may be performed. In this manner, the metrics for the UDP probes will be made more accurate by eliminating most spoofed UDP packets.

Figure 5:
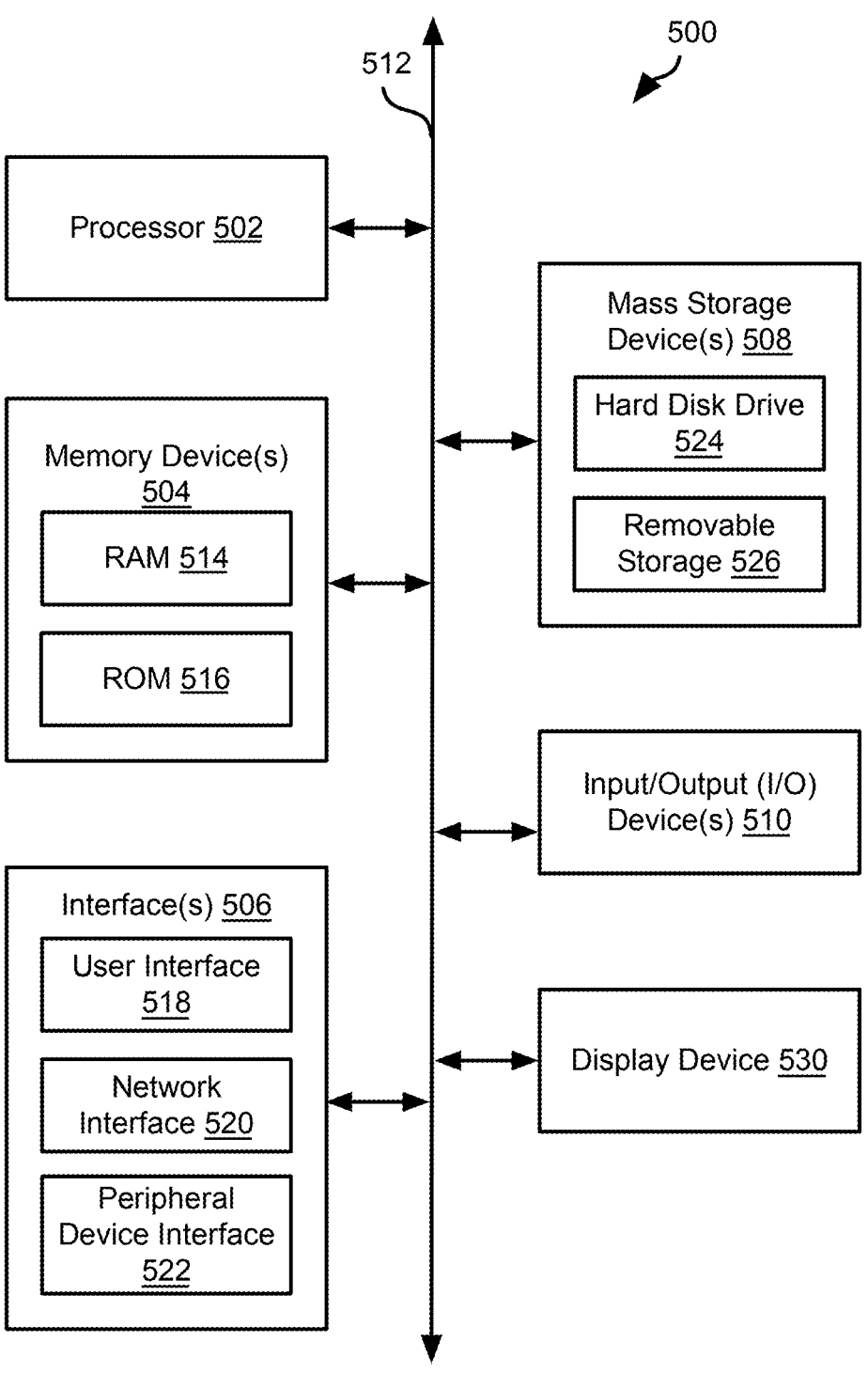
FIG. 5 is a schematic block diagram of a computing device that may be used to implement the systems and methods described herein.

FIG. 5 illustrates an example computing device 500 that may be used to implement the scanning server 102, UDP target 108, or any UDP source 222. The scanning server 102 may have some or all of the attributes of the computing device 500 of FIG. 5. FIG. 5 is also a block diagram illustrating an example computing device 500 which can be used to implement the systems and methods disclosed herein.

Computing device 500 includes one or more processor(s) 502, one or more memory device(s) 504, one or more interface(s) 506, one or more mass storage device(s) 508, one or more Input/Output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more user interface elements 518. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CDROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:

generating, according to a probe of a plurality of probes defined by a server, a probe user datagram protocol (UDP) packet, the probe UDP packet having a local address of the server as a source address of the probe UDP packet, a target address of a target as a destination address of the probe UDP packet, and a source port number of the probe UDP packet, wherein one or more bit positions of the source port number are set to a probe index of the probe;

receiving, by the server, a response UDP packet;

determining, by the server, that (a) the probe index matches the one or more bit positions of a destination port number of the response UDP packet; and in response to (a), updating, by the server, one or more metrics associated with the probe;

wherein the one or more bit positions are one or more first bit positions, the method further comprising:

generating, by the server, a first value, the first value being a function of the target address, the local address, and a random seed;

setting, by the server, one or more second bit positions of the source port number to the first value;

calculating, by the server, a second value, the second value being a function of a source address of the response UDP packet, a destination address of the response UDP packet, and the random seed;

determining, by the server, (b) that the second value matches a destination port of the response UDP packet; and updating, by the server, the one or more metrics associated with the probe in response to both (a) and (b) being true.

2. The method of claim 1, wherein the source port number is included in an ephemeral source port field of the probe UDP packet.

3. The method of claim 1, wherein the local address is a first local address of a plurality of local addresses of the server, the method further comprising:

assigning, by the server, each local address of the plurality of local addresses to one or more probes of the plurality of probes;

determining, by the server, that (b) the destination address of the response UDP packet matches the first local address, the first local address being assigned to the probe; and updating, by the server, the one or more metrics associated with the probe in response to both (a) and (b) being true.

4. The method of claim 1, wherein a payload of the probe UDP packet is defined by the probe.

5. The method of claim 4, wherein the payload of the probe UDP packet corresponds to a service.

6. The method of claim 1, wherein the local address is a first local address of a plurality of local addresses of the server, the method further comprising:

assigning, by the server, each local address of the plurality of local addresses to one or more probes of the plurality of probes;

determining, by the server, that (c) the destination address of the response UDP packet matches the first local address, the first local address being assigned to the probe; and updating, by the server, the one or more metrics associated with the probe in response to all of (a), (b), and (c) being true.

7. The method of claim 1, wherein the first value is further a function of a destination port number of the probe UDP packet and the second value is further a function of a source port number of the response UDP packet.

8. The method of claim 1, further comprising, in response to (b), performing, by the server a scan of the target.

9. The method of claim 8, wherein the scan is a full scan of a network stack of the target.

10. A system comprising:

one or more processing devices; and one or more memory devices coupled to the one or more processing devices, the one or more memory devices storing executable code that, when executed by the one or more processing devices, causes the one or more processing devices to:

generate, according to a probe of a plurality of probes, a probe user datagram protocol (UDP) packet, the probe UDP packet having a local address as a source address of the probe UDP packet, a target address of a target as a destination address of the probe UDP packet, and a source port number of the probe UDP packet, wherein one or more bit positions of the source port number are set to a probe index of the probe;

receive a response UDP packet; and if (a) the probe index matches the one or more bit positions of a destination port number of the response UDP packet, update one or more metrics associated with the probe;

wherein:

the one or more bit positions are one or more first bit positions; and the executable code, when executed by the one or more processing devices, further cause the one or more processing devices to:

generate a first value, the first value being a function of the target address, the local address, and a random seed;

set one or more second bit positions of the source port number to the first value;

calculate a second value, the second value being a function of a source address of the response UDP packet, a destination address of the response UDP packet, and the random seed;

evaluate whether (b) the second value matches a destination port of the response UDP packet; and if both (a) and (b) are true, update the one or more metrics associated with the probe.

11. The system of claim 10, wherein the executable code, when executed by the one or more processing devices, further cause the one or more processing devices to include the source port number in an ephemeral source port field of the probe UDP packet.

12. The system of claim 10, wherein:

the local address is a first local address of a plurality of local addresses; and the executable code, when executed by the one or more processing devices, further cause the one or more processing devices to:

assign each local address of the plurality of local addresses to one or more probes of the plurality of probes;

determine that (b) the destination address of the response UDP packet matches the first local address, the first local address being assigned to the probe; and update the one or more metrics associated with the probe in response to both (a) and (b) being true.

13. The system of claim 10, wherein the executable code, when executed by the one or more processing devices, further cause the one or more processing devices to generate a payload of the probe UDP packet according to the probe.

14. The system of claim 13, wherein the payload of the probe UDP packet corresponds to a service.

15. The system of claim 10, wherein:

the local address is a first local address of a plurality of local addresses;

wherein the executable code, when executed by the one or more processing devices, further cause the one or more processing devices to:

assign each local address of the plurality of local addresses to one or more probes of the plurality of probes;

evaluate whether (c) the destination address of the response UDP packet matches the first local address, the first local address being assigned to the probe; and if all of (a), (b), and (c) are true, update the one or more metrics associated with the probe.

16. The system of claim 10, wherein the first value is further a function of a destination port number of the probe UDP packet and the second value is further a function of a source port number of the response UDP packet.

17. The system of claim 10, wherein the executable code, when executed by the one or more processing devices, further cause the one or more processing devices to, in response to (b), perform a scan of the target.

18. The system of claim 17, wherein the scan is a full scan
of a network stack of the target.

* * * * *